July 7, 1964                R. D. ARDELL                3,139,786
                          FASTENING DEVICE
                         Filed Jan. 6, 1958
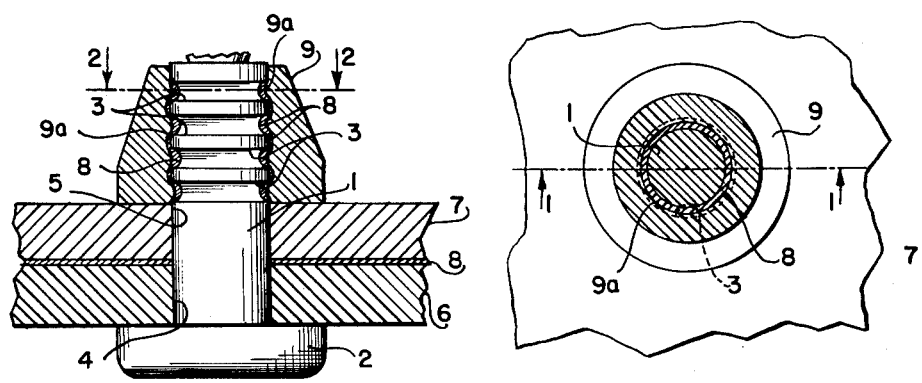
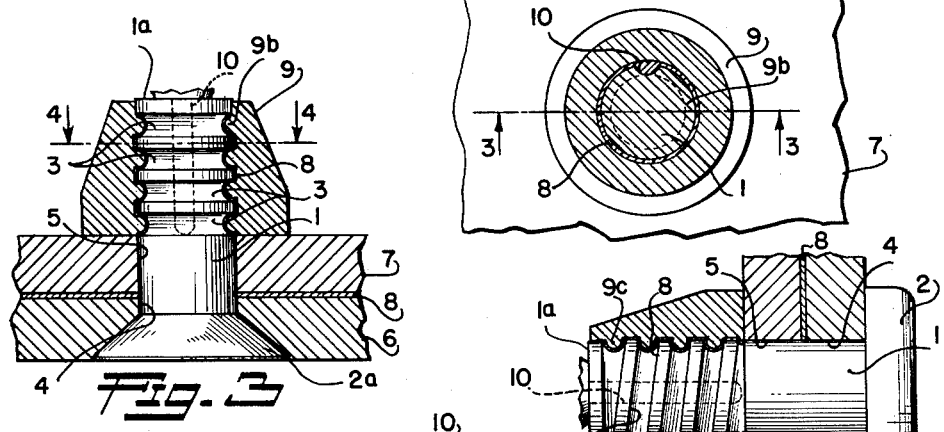
 
INVENTOR. -
RICHARD D. ARDELL
BY
*George C. Sullivan*
Agent United States Patent Office 3,139,786
Patented July 7, 1964

3,139,786
FASTENING DEVICE
Richard D. Ardell, Marietta, Ga., assignor to Lockheed Aircraft Corporation, Burbank, Calif.
Filed Jan. 6, 1958, Ser. No. 707,437
1 Claim. (Cl. 85—7)

This invention relates to a fastening device, and more particularly to an improvement of a composite type fastening device having a shank with integral head at one end and the head at the other end formed by a malleable collar swaged to the shank.

Although fastening devices of the same general type shown herein are known in the prior art, difficulty is encountered in using such devices for fastening or securing two faying members together having a sealant or sealing compound therebetween. This difficulty arises from the sealant or sealing compound getting into the shank grooves when the shank of the fastener is passed through aligned openings in the members to be fastened together. The sealant in the shank grooves prevents the collar material from properly being swaged into the grooves due to the hydrostatic pressure of the sealant produced by the swaging and the restraint of the sealant in the grooves. This in turn results in fastening strengths well below that desired.

Alleviation of the low fastening strengths resulting from this difficulty can be accomplished by wiping the sealant from the shank grooves after insertion through the aligned openings. However, this is extremely time consuming and expensive, such resulting in quite excessive labor costs when several thousand of such fastening devices are used in one structure such as a modern day aircraft. Further difficulties occur when there is insufficient space around the shank grooves in their installed position to enable a workman to wipe the sealant from the grooves.

Accordingly, it is an object of this invention to provide an improved fastening device of the type having a shank with integral head therewith at one end and the head at the other end formed by a member securable to the shank.

It is another object of this invention to provide a device permitting a strong fastening between two faying members with sealant therebetween.

A further object is to provide a fastening device for two faying members with sealant therebetween wherein the device has means for relieving sealant hydrostatic pressure generated by sealant entrapment between the shank of the fastener and a securable head thereto.

Other objects and advantages will become apparent from the following description taken in connection with the accompanying drawings in which:

FIGURE 1 is a partial cross-sectional view of the prior art fastener for showing the difficulties encountered when using such in an application encompassed in this invention;

FIGURE 2 is a view taken along line 2—2 of FIGURE 1;

FIGURE 3 is a partial cross-sectional view of one embodiment of this invention showing the improvement over the prior art;

FIGURE 4 is a view taken along line 4—4 of FIGURE 3;

FIGURE 5 is a partial cross-sectional view of a modification of the invention shown in FIGURE 3;

FIGURE 6 is a transverse cross-sectional view of the shank of a fastener device employing another modification; and FIGURE 7 is a transverse cross-sectional view similar to FIGURE 6 of a further modification of the invention.

Generally stated, the invention is practiced by the inclusion of an axial groove extending along the outer shank surface of a fastening device that incorporates a plurality of annular grooves located circumferentially around one end of the shank and onto which a malleable collar is swaged; the axial groove being in communication with one of the shank ends. Thus the axial groove permits relief of hydrostatic pressure from sealant located in the annular grooves when the malleable collar is swaged onto the shank. The hydrostatic pressure relief occurs by the axial groove forming an escape path for any entrapped sealant and permits the material of the collar to enter the annular grooves more readily, giving an increased and more appropriate fastening strength than without the axial groove.

Referring more particularly to the drawings, FIGURES 1 and 2 show the prior art device mounted in an installation encompassed in the present invention, and are included for purposes of showing the difficulties encountered therein. The main portion of the fastening device comprises a shank 1 with a head 2 integral therewith at one end. The shank 1 has a plurality of annular grooves 3 located circumferentially around the surface of shank 1 at the end thereof opposite head 2.

When used, the shank 1 is inserted in aligned openings 4 and 5 in fayed members 6 and 7 having sealant or sealing compound 8 located between the faying surfaces. Completion of the fastening occurs by the placing of a collar 9 over the annular grooved portion of shank 1 and upsetting or swaging collar 9 so that annular beads or lips 9a are formed thereon by material from the collar 9 being forced into the space of annular grooves 3. As the shank 1 is passed through the aligned openings 4 and 5 there is a sufficient amount of sealant 8 in the openings 4 and 5 so as to become gathered in the annular grooves 3 as indicated in FIGURE 1. When collar 9 is swaged to form beads 9a, the sealant 8 in the grooves 3 prevents the proper formation of the beads 9a on collar 9. This prevention is caused by the hydrostatic pressure built up in the sealant 8 in the grooves 3 which reacts against the proper formation of annular beads 9a and resulting in low strength fastenings.

Alleviation of the difficulty caused by hydrostatic pressure of sealant is accomplished by the addition of a relief groove 10, as shown in FIGURES 3 and 4, which is located axially along the outer surface of shank 1 and connects all annular grooves 3 into communication with shank end 1a. Thus sealant 8 has a passage for relieving of the hydrostatic pressure of sealant 8 allowing a better formation of beads on the inner surface of collar 9 to lock in annular grooves 3 as indicated by beads 9b in FIGURE 3. It is to be noted that some sealant 8 will still be retained between the inner surface of collar 9 and outer surface of shank 1, but the radial thickness of such sealant is substantially less than that shown in FIGURE 1.

Although the head 2a of FIGURE 3 is of the recessed type, such is merely a modification of the head 2 shown in FIGURES 1 and 5. It is also to be understood that groove 10 may be slightly tilted from its axial relationship to the outer surface of shank 1 so as to be somewhat convolute, the only requirement being that groove 10 communicate all annular grooves 3 with shank end 1a.

FIGURE 5 shows a modification of FIGURE 3 in that the annular grooves 3 of FIGURE 3 are replaced by one helical or convolute groove 3a. This in turn results in one helical or convolute bead 9c being formed on the inner surface of collar 9 after swaging rather than the plurality of beads 9b as shown in FIGURE 3. The recessed head 2a of FIGURE 3 may also be used in place of head 2 in the modification of FIGURE 5.

FIGURES 6 and 7 show modifications of the devices shown in FIGURES 3 and 5 in that a plurality of axial grooves 10 are used; two grooves 10 in FIGURE 6 and three grooves 10 in FIGURE 7. The additional number of grooves 10 may be desirable to allow escape of sealant 8, or hydrostatic relief thereof, at a faster rate than possible with only one groove. Also, multiple grooves may be desirable to allow fastening in the same time lapse with a sealant of high viscosity as with a low viscosity sealant.

As can be seen, this invention provides a fastening device of the type wherein one head is formed by the swaging of a malleable collar 9 over a grooved portion of a shank 1 that can be used for fastening to fayed surfaces together with sealant therebetween. With the addition of an axial groove 10 communicating all annular shank grooves 3 with the shank end 1a, relief of the hydrostatic pressure of sealant 8 is accomplished. This relief of pressure permits a much stronger and cheaper fastening when using a sealant in an application of this type.

It is, of course, intended to cover by the appended claim all such modifications and equivalents as fall within the true spirit and scope of this invention.

What is claimed is:

A fastening device for securing together two faying surface members having aligned openings and sealant contained between the members comprising in combination a shank having an integral head adjacent one end thereof, a first plurality of annular grooves in the outer surface of the shank adjacent the other end thereof capable of entrapping sealant when the shank is inserted through the aligned openings in the members being secured together, at least one second axially directed groove formed in said shank intersecting each of said first annular grooves and extending to said other end of the shank, and a collar adapted to be swaged into said first groove whereupon said second groove provides hydrostatic pressure relief for any sealant becoming entrapped in said first groove for increase of fastening strength between the shank and collar.

References Cited in the file of this patent
UNITED STATES PATENTS

| | | |
|---|---|---|
| 752,669 | Guzowski | Feb. 23, 1904 |
| 1,867,251 | Cowlen | July 12, 1932 |
| 1,892,119 | Thompson | Dec. 27, 1932 |
| 2,184,252 | Garrett et al. | Dec. 19, 1939 |
| 2,263,198 | Valiton | Nov. 18, 1941 |
| 2,342,170 | Tinnerman | Feb. 22, 1944 |
| 2,358,728 | Miller | Sept. 19, 1944 |
| 2,397,076 | Keller et al. | Mar. 19, 1946 |
| 2,697,873 | Cooke | Dec. 28, 1954 |
| 2,773,533 | Ohlsen | Dec. 11, 1956 |

FOREIGN PATENTS

| | | |
|---|---|---|
| 780,018 | Great Britain | July 31, 1957 |